United States Patent
Skoog et al.

(10) Patent No.: US 6,177,186 B1
(45) Date of Patent: Jan. 23, 2001

(54) HEAT REFLECTIVE, EROSION AND WEAR RESISTANT COATING MIXTURE, METHOD AND COATED ARTICLE

(75) Inventors: Andrew J. Skoog, West Chester; Norbert O. Maurer, Loveland; Jane A. Murphy, Middletown, all of OH (US)

(73) Assignee: General Electric Company, Cincinnati, OH (US)

( * ) Notice: Under 35 U.S.C. 154(b), the term of this patent shall be extended for 0 days.

(21) Appl. No.: 09/302,249

(22) Filed: Apr. 30, 1999

(51) Int. Cl.⁷ .............................. B32B 18/00; B32B 9/00; C07G 1/00; B05D 1/02
(52) U.S. Cl. .................... 428/325; 428/447; 428/472; 428/702; 106/816; 106/287.16; 106/287.17; 427/427; 427/376.4; 427/397.7
(58) Field of Search ...................... 428/325, 447, 428/469, 472, 701, 702; 427/427, 376.2, 376.4, 397.7; 106/600, 816, 287.1, 287.16, 287.17

(56) References Cited

U.S. PATENT DOCUMENTS

| | | | |
|---|---|---|---|
| 4,663,557 | 5/1987 | Martin, Jr. et al. | 313/112 |
| 4,924,141 | * 5/1990 | Taubner et al. | 313/488 |
| 5,627,426 | 5/1997 | Whitman et al. | 313/116 |
| 5,695,824 | * 12/1997 | Hiraishi | 427/376.1 |
| 5,723,937 | 3/1998 | Whitman et al. | 313/116 |

* cited by examiner

Primary Examiner—Timothy M. Speer
Assistant Examiner—Bryant Young
(74) Attorney, Agent, or Firm—Andrew C. Hess; David L. Narciso

(57) ABSTRACT

An air sprayable, fluid, non-metallic coating mixture to provide an article coating having the ability to reflect at least 75% of heat energy in the frequency range of up to 2.6 microns comprises the combination of two different alpha alumina powders. A first powder predominantly is in a particle size range of less than about 1 micron; a second powder is of a particle size greater than 7 times the particle size of the first powder. The mixture includes a glass powder having a melting point of at least about 1400° F. and of a particle size less than about 45 microns. The mixture includes a binder that will form up to about 80% of its weight in silica when heated to a temperature of at least the melting point of the glass powder. In the article coating, provided by air spraying the mixture onto an article and heating to a temperature sufficient to melt the glass powder and to form the silica from the binder, the glass and silica form a matrix about and binding together the alumina powder.

11 Claims, 2 Drawing Sheets

HEAT REFLECTIVE, EROSION AND WEAR RESISTANT COATING MIXTURE, METHOD AND COATED ARTICLE

BACKGROUND OF THE INVENTION

This invention relates to high temperature, non-metallic, heat reflecting coatings, and, more particularly, to a fluid, air sprayable, heat reflecting coating mixture, method and coated article with a coating for reflecting heat energy in a frequency range up to about 2.6 microns.

Certain articles are designed for use at elevated temperatures, for example at least about 1400° F., and also are subject to exposure to heat energy. Frequently it is desirable to provide the outer surface portion of such an article with a coating that will reflect heat energy from a metal or ceramic substrate in a selected frequency range. The coating reflects heat energy and thereby reduces heat exposure and heat stressing of the substrate. When the surface portion is intended to experience fluid borne particles, it is desirable to provide the coating with erosion resistance as well. Examples of such articles include components for glass or metal melting furnaces. Other examples are components for power generating apparatus such as gas turbine engines parts, generally made from high temperature superalloys or high temperature ceramics, and designed to operate at temperatures of up to about 2000° F. or more.

One current practice to protect a gas turbine engine article surface from the high temperatures experienced during operation is to apply a ceramic type thermal barrier coating, generally called a TBC, to its outer surface. A commonly used type of TBC is a coating based on zirconia stabilized with yttria, for example about 93 wt. % zirconia stabilized with about 7 wt. % yttria. This general type of TBC has been reported in such U.S. Pat. No. as 4,055,705-Stecura et al. (patented Oct. 25, 1977); U.S. Pat. No. 4,328,285-Siemers et al. (patented May 4, 1982); and Gupta et al. 5,236,745 (patented Aug. 17, 1993). However, such TBC coatings have a relatively rough surface and do not provide adequate heat energy reflection in frequency ranges for certain applications. In addition, application of some TBC type of coating requires use of apparatus having a controlled atmosphere or vacuum.

Another current practice for such protection is to apply to an outer surface portion a multi-layer heat reflecting coating by chemical vapor deposition (CVD). Besides being a relatively expensive type of coating, the size of an article that can be coated by CVD is limited by the size of the equipment in which the CVD is conducted, because of the controlled conditions (vacuum, inert gas, etc.) required for CVD application.

BRIEF SUMMARY OF THE INVENTION

The present invention, in one form, provides an air sprayable, fluid, non-metallic coating mixture comprising the combination of two different high purity alpha alumina powders. A first powder predominantly is in a particle size range of less than about 1 micron; a second powder is of a particle size greater than 7 times the particle size of the first powder. The mixture includes a glass powder having a melting point of at least about 1400° F. and of a particle size less than about 45 microns to provide one portion of a coating matrix about the alumina powders. The balance of the mixture comprises a binder that will form up to about 80% of the weight of the binder in silica when heated at a temperature of at least the melting point of the glass powder, to provide another portion of the coating matrix.

One form of the present invention provides a coated article having a coating comprised of the two types of alpha alumina in a matrix of the glass and the silica, the coating being of a thickness of greater than 25 microns to less than 250 microns. Another form of the invention is a method for making the coating in which method the coating mixture is provided in a fluid form suitable for air or airless spraying. The mixture is air sprayed onto an article surface to provide a coating preform. The preform then is heated at a temperature that is greater than about 1400° F., is at least the melting point of the glass powder, is below the melting point of alumina and at which the binder will form silica. This temperature melts the glass and combines with silica to form a matrix about the alumina powders.

DETAILED DESCRIPTION OF THE INVENTION

Figure 1:
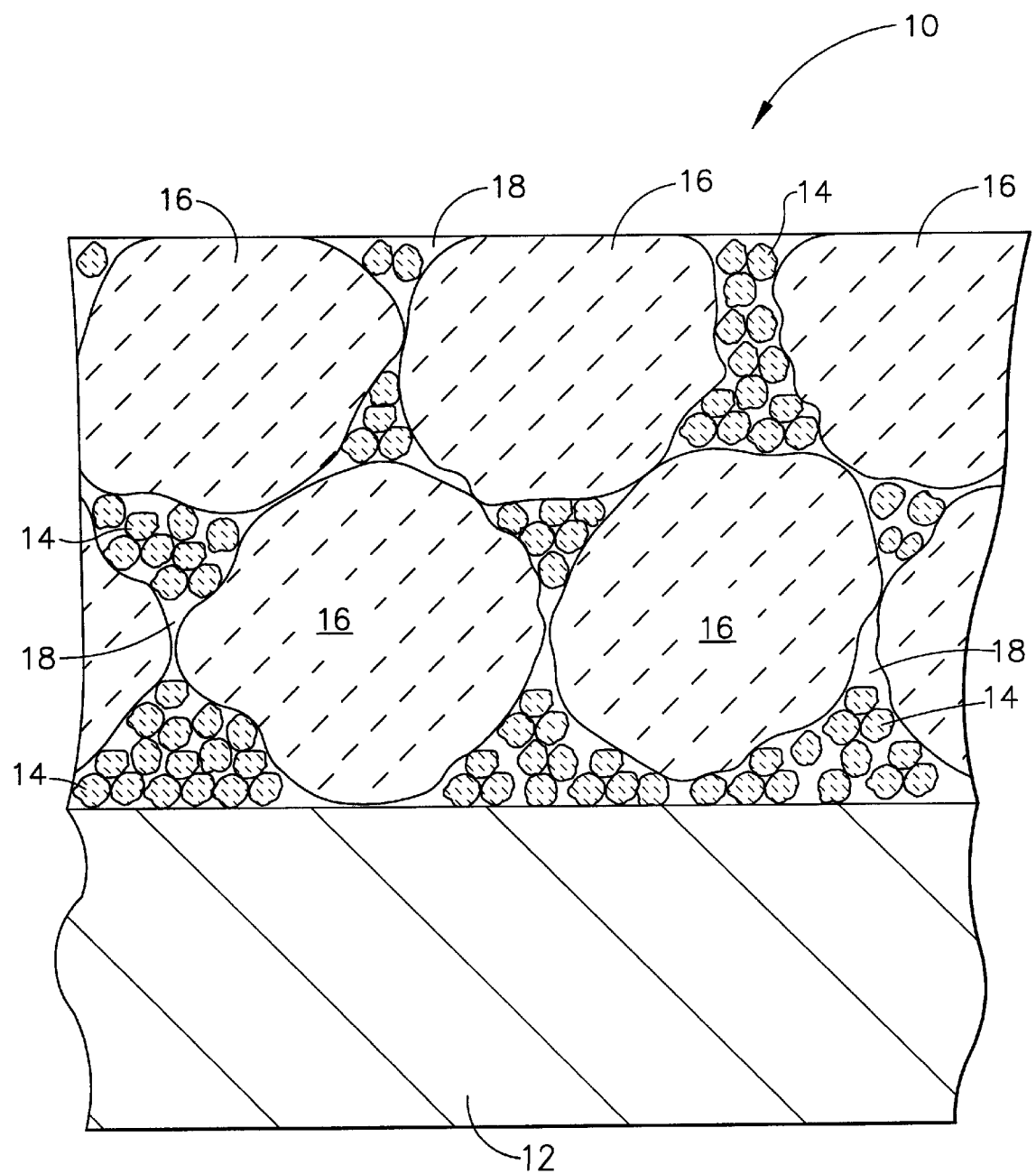
FIG. 1 is a fragmentary, sectional diagrammatic representation of a portion of the coating of the present invention on a substrate.

Reflection of heat energy from an article surface can reduce thermal induced stresses on an article substrate, increasing the operating life of the article. In a high temperature operating gas turbine engine article, such thermal reflection can reduce the amount of cooling air required to maintain safe operation of the article. Currently used TBCs can provide a thermal insulating surface but are a relatively poor heat energy reflector. Certain heat reflecting coatings, such as of the multi-layer type, must be applied by such methods as CVD requiring an atmosphere controlled container the size of which limits the size of an article which can be coated, and which is relatively expensive to operate.

One form of the present invention provides an air sprayable, fluid, non-metallic coating mixture that can be applied by ordinary paint spray type apparatus, outside of a size limiting container and not requiring a controlled atmosphere. Ingredients of the mixture comprise a combination of high purity powdered materials in selected particle sizes, together providing fluidity to enable such spraying. In addition, the combination provides good packing of the alumina particles and flow of the matrix materials glass and silica about the alumina. This results in a smooth, substantially continuous high temperature resistant coating which reflects from an article surface at least about 80% of heat energy in the frequency range of up to about 2.6 microns. This range is of particular interest with certain high temperature operating components of a gas turbine engine. The combination of ingredients in the mixture and their relative purity results in an article coating comprising particles bonded together in a relationship that results in such heat reflection, with the purity providing resistance to reduction in coating melting point during operation at temperatures of about 1400° F. and above.

The mixture of the present invention comprises the combination of four principal ingredients: two different and distinct high purity alumina powders, a glass powder and a binder that will form silica when heated to a temperature of at least the melting point of the glass powder. To provide flowability and surface wetting, such ingredients as compatible solvents and surfactants can be included in the mixture.

The two different high purity alpha alumina powders, of at least 99% and less than about 0.1 wt % soda ($Na_2O$), help define fluidity and packing while at the same time provide desired heat energy reflectance. Such high purity of at least 99%, and preferably at least about 99.5%, with the low soda, avoids contamination resulting in reduction of the melting point of a final coating on an article during high temperature operation. A first of the alumina powders has a first particle size in a range less than about 1 micron to act as a filler powder about and between a second, larger alumina powder. The second alumina powder has a second particle size greater than 7 times the first particle size of the first alumina powder. Preferably, the second alumina powder has a particle size in the range of about 45–75 microns, primarily for packing considerations. Without the first, smaller size alumina distributed about the second larger size alumina, adequate particle packing and heat reflectance would not occur: gaps or spaces between the larger alumina particles would act as black bodies and would not reflect heat energy away from a substrate. In the mixture of the present invention, each of the first and second alumina powders is included in the range of about 1–50 wt. % of the mixture. It is preferred that the first alumina powder be in the range of about 10 to less than 25 wt. %, and the second alumina powder be in the range of greater than 5 up to about 20 wt. %, and more preferably 15–20 wt. %.

The glass powder in the mixture combination has a melting point of at least about 1600° F. and a third particle size of less than about 45 microns. This size allows proper distribution of the glass powder for melting as a matrix about the two types of alumina powders to bind and help seal the alumina powders into the coating form of the present invention. In the mixture of the present invention, the glass powder is included, by weight, in a range of up to about 75% of the mixture. It is preferred that the glass powder be in the range of about 25–35%. An additional characteristic of the glass is that it not interfere with the heat reflective characteristics of the resultant coating.

The binder in the mixture combination is one that will form silica ($SiO_2$) upon heating at a temperature of at least the melting point of the glass powder. Formation of silica from the binder contributes to the stability of the coating as a part of the matrix by increasing the melting point of the glass in the mixture and thereby increasing the melting point of the coating generated from the mixture combination. The heating temperature is below that at which the alumina powder will melt. However, there can be a surface reaction between the glass and the alumina powder, particularly the smaller size first powder, tending to increase the melting temperature of the matrix. The amount of silica produced by the binder in the combination is up to about 80% of the weight of the binder so as to be transparent to heat energy. In the present mixture, the binder is included in the range of about 0.5–40 wt. %, and preferably about 5–10 wt. %. This provides up to about 0.4–30 wt %, and preferably up to about 1.7–8 wt % silica in the cured matrix.

The present coating and coated article will be more fully understood by reference the drawings. FIG. 1 is a fragmentary, sectional diagrammatic representation of a portion of a coating 10 of one form of the present invention on a metallic substrate 12. Coating 10 is shown after having been heated to at least the melting point of its glass ingredient to melt the glass and form the above-described silica from the binder.

Coating 10 comprises a first alpha alumina powder 14 having a particle size less than about 1 micron distributed in the interstices about a second alpha alumina powder 16 of a particle size greater than 7 times the size of the first powder 14. It is known that such a size relationship is necessary for proper packing of two sizes of alumina powders. This promotes a desired amount of heat energy reflectance in the frequency range of up to about 2.6 microns.

Bonding the alumina particles into the coating is matrix 18 surrounding the alumina particles as shown. Matrix 18 is comprised of the above-described type of glass after melting, along with silica distributed in the glass during such melting and as a result of formation of the silica from the binder. One feature of the mixture of the present invention is the ability to form silica mixed with the glass. After coating formation, this combination of glass and silica increases the melting point of the resultant coating above the melting point of the glass alone.

In one specific series of evaluations in which coating 10 of FIG. 1 was prepared, the first alpha alumina powder was an ultra-pure alumina marketed by Baikowski International Corporation as SM8 material, with a specified purity of 99.99% and a particle size less than 1 micron. The second alpha alumina powder was a calcined alumina marketed by Alcoa Chemical Division as A-14 material, with a specified purity of 99.8% and a particle size predominantly in the range of greater than 45 to less than about 75 microns. For this particular combination of alumina powders in the mixture of the present invention, it was found that, based on the total weight of ingredients in the mixture, a combination of about 10 to less than 25% of the first alumina SM8 material along with greater than about 5 to about 20% of the second alumina A-14 material provided an excellent combination of packing and heat energy reflection. For example, by weight, one mixture in the series including A-14 material at 4.7% and SM8 material at 25.1% was not as good as another mixture including 17.2% A-14 material and 12.5% SM8 material. The preferred combination of the two types of alumina in the mixture is, by weight, 10–15% of the first alumina powder, for example SM8 material, and 15–20% of the second alumina powder, for example A-14 material.

Another ingredient in the mixture in this series of evaluations was a glass powder having a melting point of at least about 1400° F. and a particle size of less than about 45 microns for proper distribution about the alumina particles before melting and flow about the such particles during melting. Although up to about 75 wt. % glass powder can be included in the mixture of the present invention, in this series of evaluations glass powder in the range of about 25–35 wt. % was included and is preferred based on distribution and flow during melting. Selection of the glass includes consideration of the intended operating temperature of the resultant coating. In this series, a one preferred glass powder (V212) had a melting point of about 1616° F. and another (V55B) had a melting point of about 1780° F. Coatings produced using the higher melting V55B glass, to form the matrix with silica from the binder about the alumina particles, showed excellent resistance to wear and creep when tested at temperatures up 1800° F. The increased temperature capability of the coating of the present invention to maintain strength and hardness above the melting point of the glass is believed to be a result of the silica from the binder increasing the melting point of the matrix. Another glass powder (EG2782) evaluated had a melting point of about 1200° F. and resulted in a coating that showed creep when tested at temperatures of 1600° F. and above.

The fourth principal ingredient of the mixture in this series of evaluations was a silicone binder commercially identified as SR 355 material and which provided about 35% of its weight in silica. Although it is preferred that between about 0.5 and 40 wt. % of the mixture can be binder, in this series the binder was included in the range of about 5–10 wt. %, resulting in about 1.7–3.5 wt % silica in the cured matrix. As was mentioned above, the silica from such a binder in combination with the glass will form, during melting, a matrix about the alumina particles, the matrix having an appropriate increase in melting temperature. However, inclusion of a binder which results in the formation of more than about 80% of its weight in silica can result in an excessive increase in matrix temperature, adversely affecting the ability of the coating to reflect heat energy in the frequency range of up to about 2.6 microns.

To provide the mixtures in this series of evaluations with fluidity adequate for paint type spraying, the mixtures included liquids such as solvents and surfactants compatible with the binder and comprising about 30–35 wt. % of the mixture. In particular, the solvent was a mixture of isopropyl alcohol and ethyl alcohol, with a surfactant commercially available as Merpol material.

The above described mixtures were paint sprayed onto a substrate of a high temperature Ni base superalloy to provide a final, fired coating of a thickness of greater than 25 microns to less than 250 microns. A thickness of less than 25 microns is insufficient to reflect adequate heat energy in the frequency range of up to 2.6 microns; and a thickness of 250 microns or more reduces the flexural fatigue strength of the coating which then tends to spall from the substrate.

In this series, a coating was sprayed to result in a cured thickness in the range of about 50–150 microns. Shrinkage of the as-sprayed coating can be from about 5–50% after curing. Such sprayed coating was allowed to dry over night and then fired at a temperature greater than the melting point of the glass and less than 2500° F., depending on the substrate. This provided, in situ, a coating having a melting point greater than the glass that forms a part of the matrix. In these examples, the firing conditions were 1840° F. for 2 hours for the V55B glass that has a melting point of about 1780° F.

Figure 2:
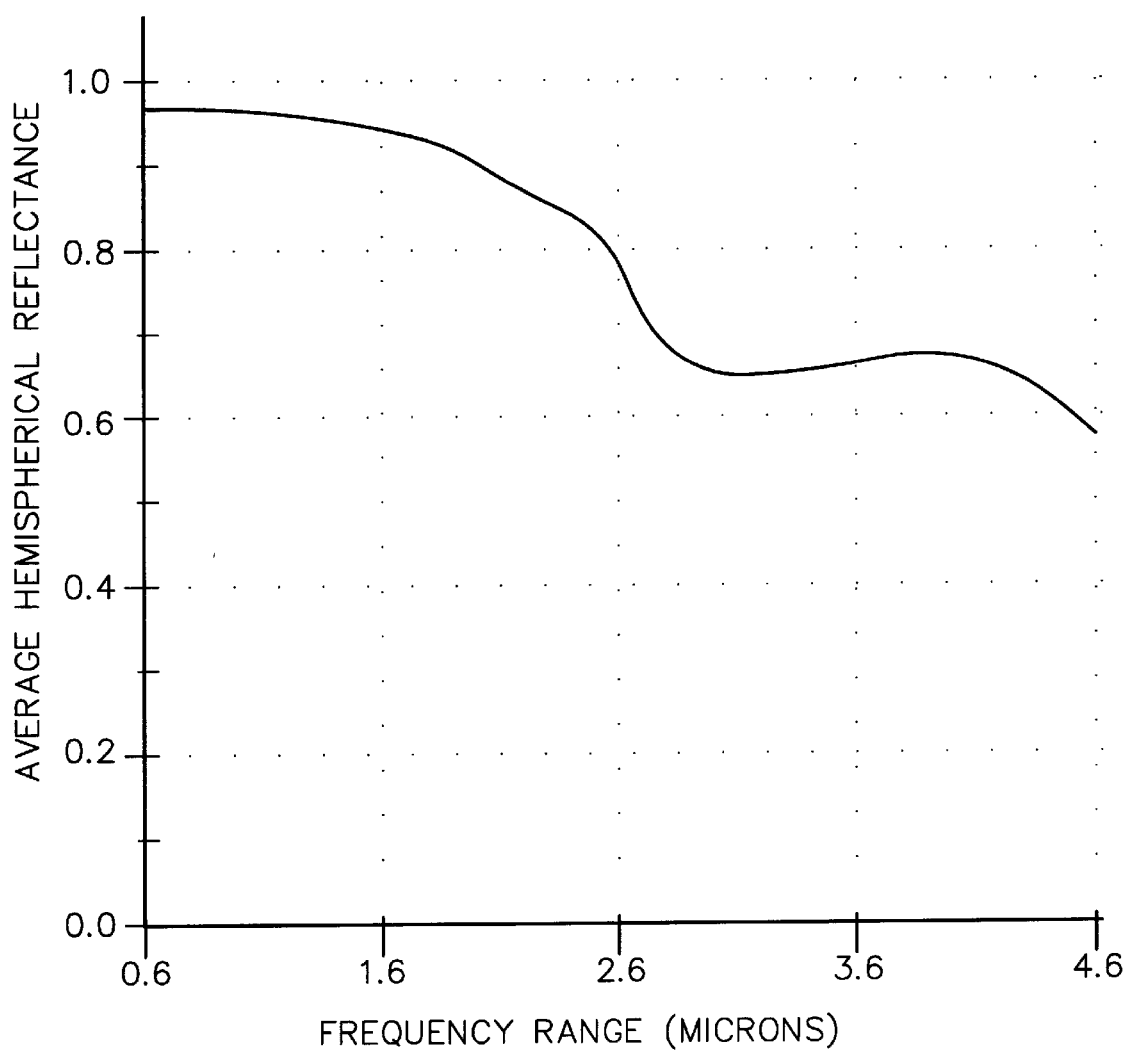
FIG. 2 is a graph comparing the average amount of hemispherical reflectance with heat energy frequency range at a variety of energy incidence angles for the coating of the present invention after thermal exposure.

Evaluation of the coating of the present invention included determining its heat energy reflectance at various frequencies. The graphical presentation of FIG. 2 compares the average amount of hemispherical reflectance, from a preferred form of the coating of the present invention, with heat energy frequency range. The reflectance data of FIG. 2 were measured at incidence angles of 10, 30, 50 and 70° after treatment in a furnace at 1840° F. for 2 hours. The coating, which had a cured thickness in the range of about 50–150 microns on a Ni base superalloy specimen, was produced by firing a mixture comprising, by weight, about: 12.5% of the first alumina powder SM8, 17% of the second alumina powder A-14, 30% of the glass powder V55B, 7.5% of the silicone binder SR355, about 2% of the surfactant Merpol, with the balance a solvent mixture of isopropyl alcohol and ethyl alcohol. Testing included directing heat energy at the coated surface and measuring the amount of reflectance at each angle. The curve of FIG. 2 is an average of such testing. In the hemispherical reflectance test, a specimen is placed within a gold-coated sphere that includes a port for incoming waves and a port with a detector for making measurements.

The data of FIG. 2 show an average reflectance of at least about 75% of the heat energy in the frequency range of up to about 2.6 microns, at least about 85% in the range of up to about 2.4 microns, and at least about 90% in the range of up to about 2.0 microns. These ranges are of particular interest with components of gas turbine engines operating in the turbine section.

The present invention has been described in connection with specific examples, embodiments, and materials. However, it should be understood that they are intended to be representative of, rather than in any way limiting on, its scope. Those skilled in the various arts involved will understand that the invention is capable of variations and modifications without departing from the scope of the appended claims.

What is claimed is:

1. An air sprayable, fluid, non-metallic coating mixture comprising the combination of:
    a first alpha alumina powder of a purity of at least 99%, having less than 0.1 wt. % soda, and having a first particle size less than 1 micron;
    a second alpha alumina powder of a purity of at least 99%, having less than 0.1 wt. % soda, and having a second particle size greater than 7 times the first particle size of the first alumina powder;
    a glass powder having a melting point of at least 1400° F. and a third particle size of less than 45 microns; and,
    a binder which will form silica upon heating at a temperature of at least the melting point of the glass powder, the amount of silica formed being up to about 80% of the weight of the binder.

2. The mixture of claim 1 in which:
    the first alumina powder is 1–50 wt. %;
    the second alumina powder is 1–50 wt. %;
    the glass powder is up to 75 wt. %; and,
    the binder is 0.5–40 wt. %.

3. The mixture of claim 2 in which:
    the first alumina powder is 10 to less than 25 wt. %;
    the second alumina powder is greater than 5 up to 20 wt. %, the second alumina powder having a particle size in the range of 45–75 microns;
    the glass powder is 25–35 wt. %; and,
    the binder is 5–10 wt. % and is of a type which will form up to about 80% of its weight in silica.

4. The mixture of claim 3 in which:
    the first alumina powder is 10–15 wt. %;
    the second alumina powder is 15–20 wt %;
    the glass powder is 25–35 wt. %; and,
    the binder is a silicone which will form about 25–50% of its weight in silica.

5. An air sprayable, fluid, non-metallic coating mixture comprising the combination of:
    10 to less than 25 wt. % of a first alpha alumina powder of a purity of at least 99.5% and less than 0.1 wt % soda, the first powder having a first particle size less than 1 micron;
    greater than 5 up to 20 wt. % of a second alpha alumina powder of a purity at least 99.5% and less than 0.1 wt. % soda, the second powder having a second particle size in the range of 45–75 microns;
    25–35 wt. % of a glass powder having a melting point of at least 1400° F. and a third particle size of less than 45 microns; and,
    5–10 wt. % of a binder that will form up to about 80% of its weight in silica.

6. The mixture of claim 5 in which:
    the first alumina powder is 10–15 wt. %;
    the second alumina powder is 15–20 wt. %; and,
    the binder is a silicone that will form about 25–35% of its weight in silica.

7. The mixture of claim 6 including, in addition, 30–35 wt. % of liquid compatible with the silicone binder and selected from the group consisting of alcohols and surfactants.

8. A coated article for operation at a temperature of at least 1400° F., comprising a substrate and a non-metallic coating over the substrate, the coating comprising:

- 1–50 wt. % of a first alpha alumina powder having a first particle size of less than 1 micron;
- 1–50 wt. % of a second alpha alumina powder having a second particle size greater than 7 times the first particle size of the first alumina powder; and,
- a matrix about and binding together the first and second alumina powders;
- the first alumina powder distributed in the matrix about the second alumina powder;
- the matrix comprising a glass having a melting point of at least 1400° F. and in which silica is distributed;
- the coating having a thickness in the range of greater than 25 to less than 250 microns, and the ability to reflect at least 75% of heat energy in the frequency range of up to 2.6 microns.

9. The coating in claim 8 in which:

- the first alumina powder is 10 to less than 25 wt. %;
- the second alumina powder is greater than 5 up to 20 wt. %, and has a second particle size in the range 45–75 microns;
- the glass is up to 75 wt. %; and,
- the silica in the matrix is 0.4–30 wt. %.

10. The coating of claim 9 in which:

- the first alumina powder is 10–15 wt %;
- the second alumina powder is 15–20 wt %;
- the glass is 25–35 wt %; and,
- the silica in the matrix is 1.7–8 wt %;
- the coating having the ability to reflect at least 85% of heat energy in the frequency range of up to 2.4 microns.

11. A method for providing a high temperature article with a non-metallic heat reflective, erosion and wear resistant coating, comprising the steps of:

- providing the mixture of claim 1 in fluid form suitable for air spraying;
- air spraying the mixture onto an article surface to provide a coating preform that will result in the coating having a thickness greater than 25 microns to less than 250 microns; and,
- curing the coating preform on the article surface by heating the preform to a temperature greater than 1400° F. for a time sufficient to melt the glass in the mixture, to form silica from the binder, and to form a matrix of the glass and the silica about the alumina powder.

* * * * *